Sept. 30, 1958 P. ZERHAN, JR 2,854,278
BUMPER EXHAUST
Filed Sept. 12, 1955 2 Sheets-Sheet 1

INVENTOR.
Peter Zerhan, Jr.
BY
ATTORNEY

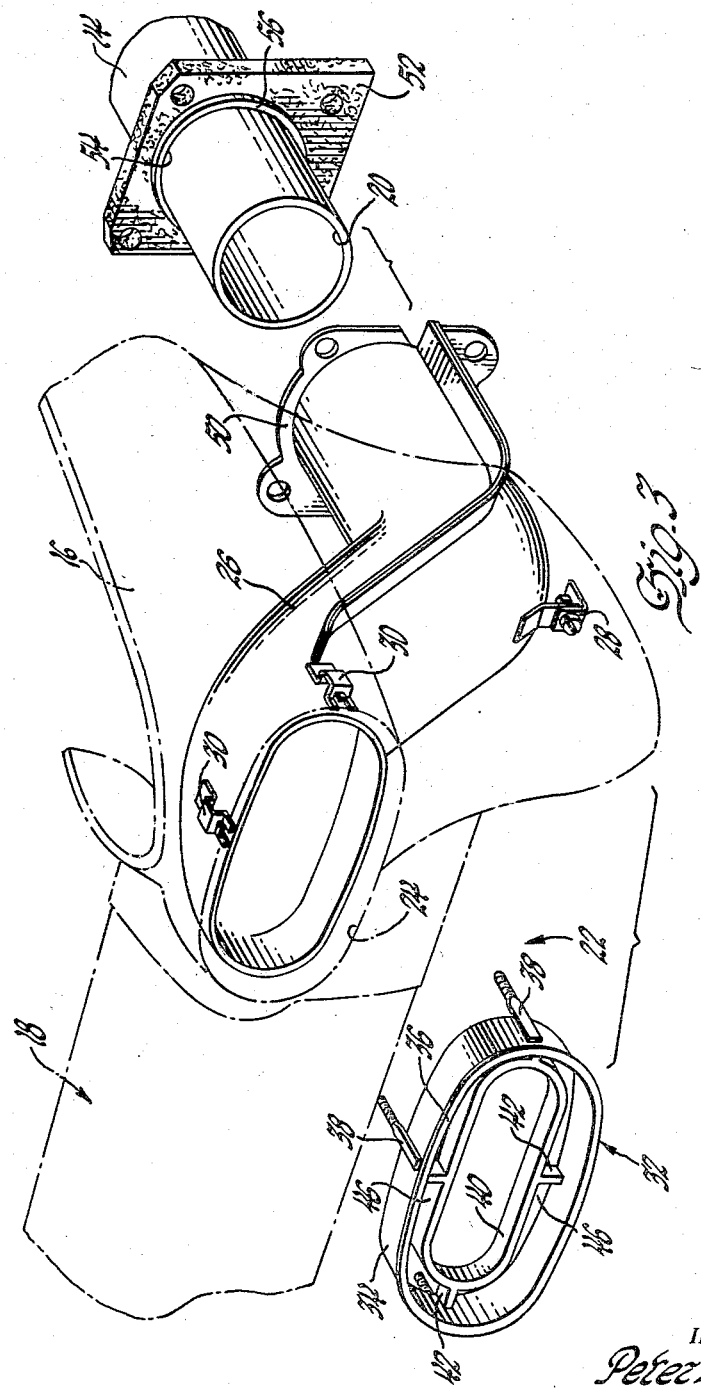

United States Patent Office 2,854,278
Patented Sept. 30, 1958

2,854,278

BUMPER EXHAUST

Peter Zerhan, Jr., Dearborn, Mich., assignor to General Motors Corporation, Detroit, Mich., a corporation of Delaware Application September 12, 1955, Serial No. 533,675

2 Claims. (Cl. 293—69)

The present invention relates to exhaust systems for engines in automotive vehicles and more particularly to means for mounting the outlet end of an exhaust tailpipe for discharging the engine exhaust gases through an aperture in a bumper or impact member on such a vehicle.

In an automotive vehicle having an internal combustion engine with an exhaust system for discharging the engine exhaust gases into the atmosphere, it is desirable that the outlet end of the exhaust system be disposed at the rear end of the vehicle for discharging the exhaust gases into the atmosphere at the rear of the vehicle where they will be harmlessly dissipated. However, at the present time the styling and engineering trends in the automotive field have resulted in longer and lower vehicles. As a consequence, if the discharge end of the exhaust tailpipe projects downwardly from the rear end of the vehicle, it will be frequently damaged as a result of striking obstructions. Accordingly, it is desirable that the end of the tailpipe be at least as high as the body of the vehicle. Therefore in recent years, it has been the practice to provide some form of discharge means on a portion of the body such as the rear bumper for concealing the exhaust pipe and providing a decorative discharge means that allows the exhaust gases to be discharged therethrough. Although this allows the tailpipe to be elevated sufficiently to prevent damage thereto, difficulties are frequently encountered in corrosion and/or staining of the body members by the noxious substances in the exhaust gases. In addition, the vibrations produced by the exhaust gases in the exhaust system are frequently transferred to the body structure and become objectionable to the occupants of the vehicle.

It is now proposed to provide exhaust means for an automotive vehicle wherein the outlet end of the exhaust tailpipe may be mounted to discharge through the rear bumper of the vehicle. This means will not only prevent the transfer of objectionable vibrations into the passenger compartment but will also prevent staining or corrosion of the body members by the corrosive liquids in the exhaust gases.

In the two sheets of drawings:

Figure 3 is an exploded perspective view showing the elements of the structure in Figure 2.

Figure 1:
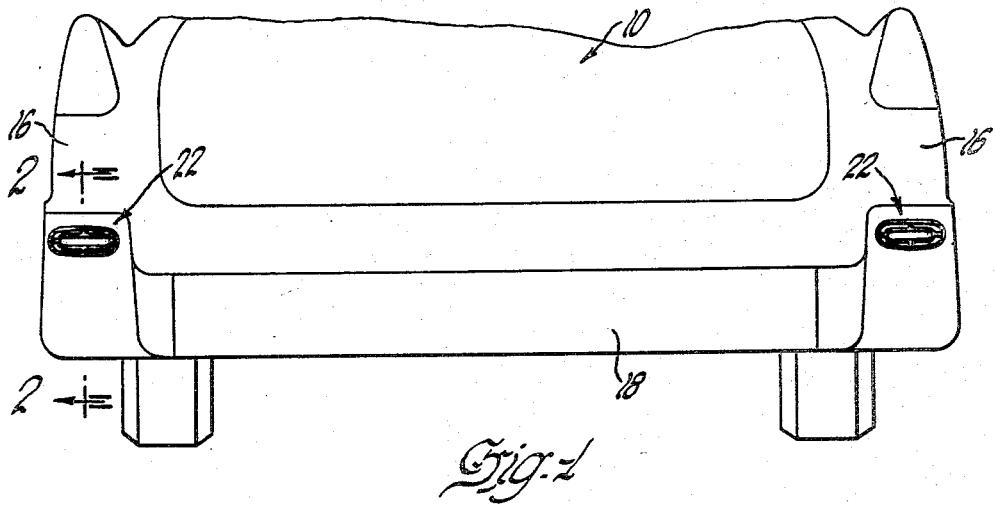
Figure 1 is an end view of an automobile embodying the present invention.
Figure 2:
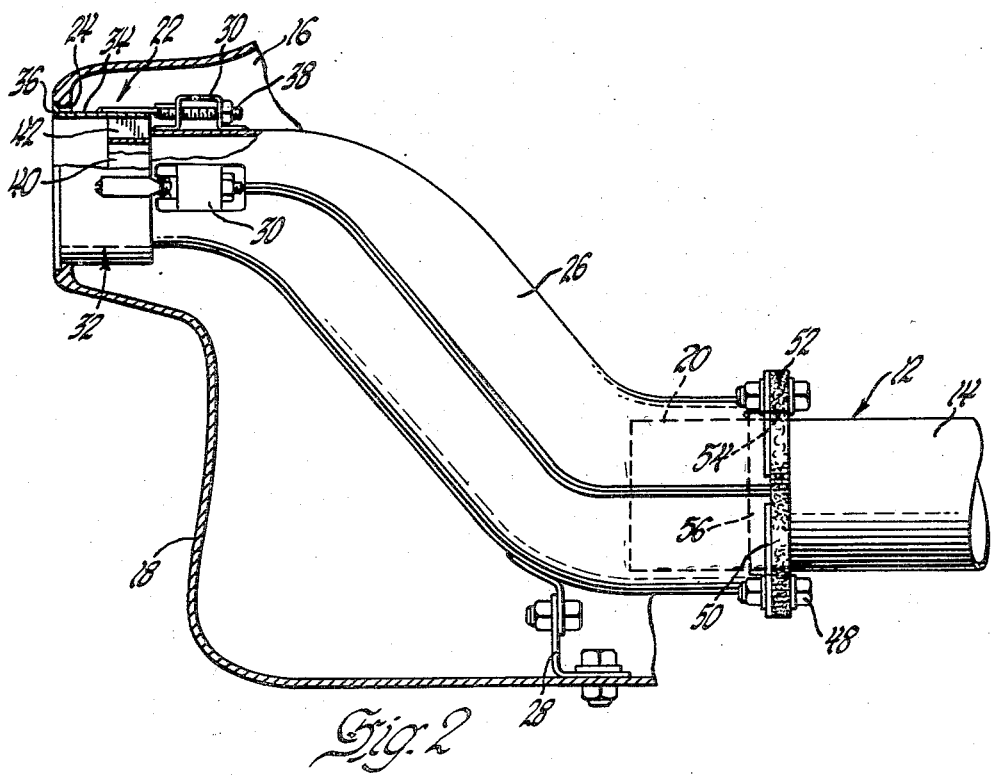
Figure 2 is a cross sectional view taken substantially along the plane of line 2—2 in Figure 1.

Referring to the drawings in more detail, the present invention may be adapted for use on an automotive vehicle 10 having an internal combustion engine with an exhaust system 12 including one or more exhaust conduits. In the present instance each of these exhaust conduits extend longitudinally of the vehicle 10 and include a tailpipe 14 disposed underneath the body. The tailpipes 14 are disposed just inside of the rear fenders 16 and terminate adjacent the bumper 18 for discharging the engine exhaust gases from the rear of the vehicle 10.

Since the discharge ends 20 of the tailpipes 14 are disposed behind the road wheels, they are especially susceptible to damage as a result of striking obstructions, unless maintained at least as high as the lower extremity of the body or the bumper 18. Accordingly, the ends of the tailpipes 14 terminate inside of the rear bumper 18. In order to allow an unobstructed flow of gases from the tailpipes 14 into the atmosphere, exhaust means 22 may be provided in the rear bumper 18 for supporting the ends 20 of the tailpipes 14 and allowing the exhaust gases to flow through the bumper 18.

In the present instance each of these exhaust means 22 includes an aperture 24 in the rear bumper 18 and a transition member 26 that has one end registering with the aperture 24 and the other end adapted to receive the outlet end 20 of the tailpipe 14. This transition member 26 may be reversely bent if desired so that the one end may be above the other while still permitting a substantially horizontal gas flow. The lower bend in the transition member 26 may be secured to the bottom of the rear bumper by a bracket 28. At the same time the upper end of the transition member 26 may include a plurality of clips 30 which are circumferentially spaced therearound. A bezel 32 comprising an outer sleeve 34 may be disposed in the aperture with a radial flange 36 blending into the bumper to form a decorative member. A plurality of threaded members 38 may be mounted on the bezel 32 so as to extend through the clips 30 and be secured thereto by nuts. It is thus apparent that the transition member 26 will be rigidly secured to the bumper 18 and thus retained in position thereon. It should be noted that the bezel 32 may be of any cross section to give the desired appearance. In the present instance an inner sleeve 40 is disposed inside of the outer sleeve 34 and retained in spaced relation therewith by spaced radial fins 42. Thus if the end of the transition member 26 is shaped similar to bezel 32 and abuts the fins 42, an annular space 46 will be provided for the flow of air. The air will tend to flow from in front of the bumper 18 through this space 46 and form a protective envelope of cool air around the exhaust gases that will separate them from the decorative surface of the bumper 18.

Fastening means 48 may be provided in order to retain the end 20 of the tailpipe 14 properly positioned in the transition member 26. In the present instance this fastening means 48 includes a radial flange 50 that projects outwardly from the transition member 26 and a sound deadening member 52 such as a tire carcass that is secured to this flange 50 by bolts. An enlarged opening 54 in the center of the sound deadening member 52 may receive the tailpipe so that it will completely be encompassed thereby and retained in spaced relation inside of the transition member 26. It is thus apparent that the sound deadening member 52 will be acoustically isolated from the transition member 26 and accordingly, there will be no transmission of noise from the exhaust system to the vehicle body. Since the bumper member 18 may move as a result of impact and/or the length of the exhaust system may change with changes in temperature, it is desirable to allow for relative movement between the tailpipe and transition member. Thus a bushing 56 of non-corrosive metal such as brass may be disposed in the opening 54 for slidably receiving the tailpipe 14.

Since the cross section of the transition member 26 is considerably larger than the tailpipe 14, the velocity of the gases therein will be considerably lower. Thus any condensate blow from the tailpipe 14 will tend to collect on the transition member 26 and drain into the lower portion thereof. Although the leakage normally present between the flange 50 and sound deadening member 52 will allow this liquid to escape, any suitable drain such as a small hole may be provided in the bottom of the transition member 26.

It is to be understood that, although the invention has been described with specific reference to a particular embodiment thereof, it is not to be so limited since changes and alterations therein may be made which are within the full intended scope of this invention as defined by the appended claims.

I claim:

1. An exhaust device for motor vehicles comprising, a wall forming a continuous part of the exterior surface of the body of a motor vehicle, said wall being formed to extend transversely across said body at the lower extremity of the rear end of said body and providing a bumper impact member for the rear end of said body, a transverse opening formed in said wall for discharging exhaust gas beyond said wall and at the rear of said body, exhaust conduit means associated with said body and extending along said body and toward said wall and having an end terminating adjacent said opening, a bezel member disposed within said opening and abutting said wall and having spaced inner and outer sleeves forming an annular passage, a tubular transition member of larger cross section than said exhaust conduit means and secured to said wall and telescopically receiving said exhaust conduit means and having an opposite end disposed in alignment with said opening and engaging said bezel member and in a position to discharge exhaust gas through said inner sleeve and outwardly beyond said wall, said opposite end of said transition member being disposed inwardly of said outer sleeve thereby permitting the flow of air inwardly of said outer bezel member and through said annular passage from the front to the rear of said bezel member and said wall, and heat and sound insulating and absorbing means disposed between the telescoping end of said transition member and said exhaust conduit means and supporting said exhaust conduit means within said transition member and providing a thermal and vibrational break between said exhaust conduit means and said transition member and said wall.

2. An exhaust device for motor vehicles as defined by claim 1 and in which said wall is formed to provide a recess opening toward the front of said vehicle and including lower wall means extending toward the front of said vehicle and defining the lower extremity of said recess and rear wall means extending upwardly from said lower wall means and defining the rear extremity of said recess, said transition member being a reversely bent member having the end thereof receiving said exhaust conduit means disposed in the lower part of said recess and secured to said lower wall means and having said opposite end disposed in an upper part of said recess and secured to said bezel member and to said rear wall means.

References Cited in the file of this patent

UNITED STATES PATENTS

| 119,571 | Buttles | Oct. 3, 1871 |
| 2,318,006 | Mercier | May 4, 1943 |
| 2,489,480 | Chester | Nov. 29, 1949 |
| 2,515,391 | Arbib | July 18, 1950 |
| 2,568,409 | Phillips | Sept. 18, 1951 |
| 2,647,533 | Beymer | Aug. 4, 1953 |

FOREIGN PATENTS

| 657,569 | France | Mar. 29, 1929 |